US007408311B2

United States Patent
Novelli et al.

(10) Patent No.: US 7,408,311 B2
(45) Date of Patent: Aug. 5, 2008

(54) PROTECTION DEVICE FOR ELECTRIC MOTOR DRIVING DEVICES AND CORRESPONDING DRIVING DEVICE

(75) Inventors: Aldo Novelli, Parabiago (IT); Vincenzo Marano, Muggio (IT); Luca Giussani, San Vittore Olona (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 97 days.

(21) Appl. No.: 11/413,654

(22) Filed: Apr. 27, 2006

(65) Prior Publication Data
US 2006/0244405 A1 Nov. 2, 2006

(30) Foreign Application Priority Data
Apr. 29, 2005 (IT) .......................... MI2005A0775

(51) Int. Cl.
*H02P 1/00* (2006.01)
(52) U.S. Cl. ........................ 318/138; 318/254; 318/439; 363/23; 363/30; 363/93.1
(58) Field of Classification Search ................ 318/254, 318/138, 439; 361/23, 30, 31, 93.1
See application file for complete search history.

(56) References Cited

U.S. PATENT DOCUMENTS

| 4,404,478 A | * | 9/1983 | Rischmuller | ................. 327/575 |
| 4,654,568 A | * | 3/1987 | Mansmann | .................. 318/293 |
| 5,495,154 A | * | 2/1996 | Carobolante | ................. 318/254 |
| 5,939,863 A | * | 8/1999 | Miller | ......................... 320/136 |
| 2005/0286194 A1 | * | 12/2005 | Fujiki et al. | .................. 361/100 |

* cited by examiner

*Primary Examiner*—Rina I Duda
(74) *Attorney, Agent, or Firm*—Lisa K. Jorgenson; Robert Iannucci; Seed IP Law Group PLLC

(57) ABSTRACT

A protection device protects a driving device of an electric motor with at least three phases and at least three windings and the driving device comprises a power stage suitable for driving directly said at least three windings. The driving device is suitable for actuating a motor brake operating phase and comprises detectors suitable for detecting the currents that run in the windings of the motor. The protection device comprises selectors suitable for selecting the currents having a single direction between said detected currents and a deactuator suitable for deactuating the power stage during said motor brake operating phase when the sum of the currents having a single direction is greater than a reference current.

19 Claims, 2 Drawing Sheets

PROTECTION DEVICE FOR ELECTRIC MOTOR DRIVING DEVICES AND CORRESPONDING DRIVING DEVICE

BACKGROUND OF THE INVENTION

1. Field of the Invention

The present invention refers to a protection device for driving devices for electric motors and corresponding driving device.

2. Description of the Related Art

In the prior art, driving devices for three-phase motors are known that implement the operating phase of the motor brake, i.e., the operating phase in which the three-phase motor is stopped rapidly.

FIG. 1 shows a diagram of a three-phase motor provided with a driving device that implements the motor brake operating phase. The three-phase motor comprises the star-connected windings 1-3 (the solution is also suitable in the case of delta-connected windings) at the common terminal D and having the other terminals connected respectively at the nodes A-C with the half-bridges 4-6; the latter are made with power switches such as MOS transistors or bipolar power switches or IGBTs and are the power stage for driving the windings 1-3. The half-bridges 4-6 are connected between a supply voltage Vs and ground GND and are driven by respective terminal elements 7-9 forming part of a driving device 10. The elements 7-9 are circuitally connected to a main element 11 that implements several control functions including the motor brake or brake operating phase. To obtain rapid braking of the electric motor the windings 1-3 are short-circuited to the supply voltage Vs or to ground GND; the current in the windings of the motor will reach a zero value in a period of time that depends on the features of the motor and on the application.

During actuation of the brake operating phase in the windings of the motor current overshoots occur due to the presence of the back electromotive force (BEMF) that depends on the electric constant of the motor and on the rotation speed. Said overshoots can exceed the maximum permitted current in the half-bridges 4-6 and can determine failure of the brake operating phase or also failure of the power stage formed by the half-bridges.

BRIEF SUMMARY OF THE INVENTION

In view of the prior art, the object of the present invention is to provide a protection device for the driving device of electric motors that enables the above drawbacks to be overcome.

According to the present invention, this object is achieved by means of a protection device for a driving device of an electric motor with at least three phases, said electric motor comprising at least three windings and said driving device comprising a power stage suitable for driving directly said at least three windings, said driving device being suitable for actuating a motor brake operating phase, said driving device comprising means suitable for detecting the currents that flow in the windings of the motor, characterized in that it comprises first means suitable for selecting the currents having a single direction between said detected currents and second means suitable for deactuating said power stage during said motor brake operating phase when the sum of said currents having a single direction is greater than a reference current.

Still according to the present invention it is possible to provide a driving device for an electric motor as defined in claim 5.

BRIEF DESCRIPTION OF THE SEVERAL VIEWS OF THE DRAWINGS

The characteristics and advantages of the invention will be made more evident from the following detailed description of an embodiment thereof illustrated as non-limiting example in the enclosing drawings, in which.

DETAILED DESCRIPTION OF THE INVENTION

Figure 1:
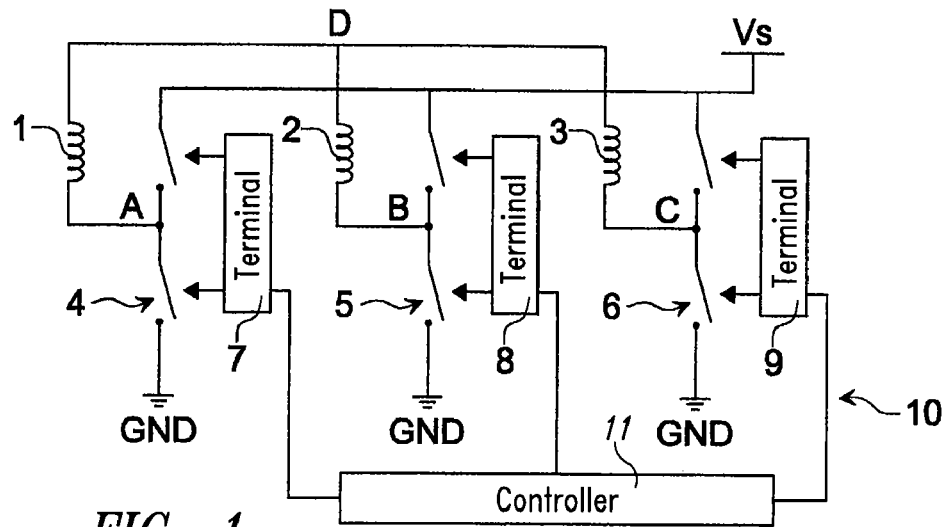
FIG. 1 is a circuit diagram of a three-phase motor and of a driving device of the motor according to the prior art.
Figure 2:
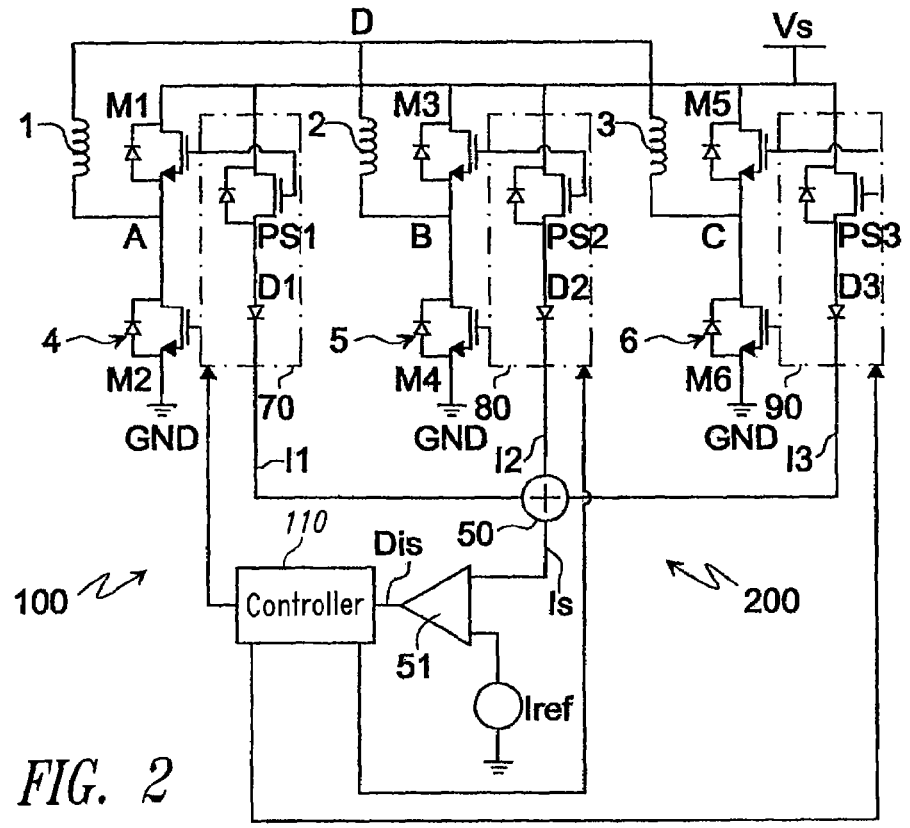
FIG. 2 is a circuit diagram of a three-phase motor and of a driving device of the motor provided with a protection device according to the present invention.

FIG. 2 shows a three-phase electric motor with a motor driving device provided with a protection device according to the present invention; the elements in FIG. 2 that are also present in FIG. 1 will be indicated by the same numerical references. The three-phase motor comprises the windings 1-3 that are star-connected at the common terminal D and have the other terminals respectively connected at the nodes A-C with the half-bridges 4-6. The latter are made with power switches such as MOS transistors or bipolar power switches or IGBTs and constitute the power stage for driving the windings 1-3; in the case of the driving device 100 in FIG. 2 the half-bridges 4-6 are made with respective DMOS transistors M1-M2, M3-M4 and M5-M6. The half-bridges 4-6 are connected between a supply voltage Vs and ground GND and are driven by respective terminal elements 70-90 forming part of the driving device 100. The elements 70-90 are circuitally connected to a main element 110 that implements numerous control functions including the motor brake or brake operating phase. To obtain rapid braking of the electric motor, the windings 1-3 are short-circuited to the supply voltage Vs or to ground GND; the current in the windings of the motor will reach a zero value in a period of time that depends on the features of the motor and on the application.

The driving circuit 70-90 comprises means suitable for detecting the current that runs in each half-bridge and in each winding of the electric motor during operation of the electric motor. Said means comprises three power or power sense transistors PS1-PS3 connected to the respective half-bridges 4-6. The currents I1-I3 constitute portions of the currents that circulate in the windings of the motor during the operation thereof.

The driving device 100 also comprises a protection device 200 suitable for limiting the value of the maximum current that can circulate in the windings of the electric motor.

The protection device 200 comprises first means D1-D3 suitable for selecting the currents having a single direction between said currents I1-I3 that flow in the windings 1-3 of the motor and that are detected by the PS1-PS3 and second means 51 suitable for deactuating said power stage 4-6 during said motor brake operating phase when the sum Is of said currents having a single direction is greater than a reference current Iref.

In particular, the protection device 200 comprises the diodes D1-D3 connected to the respective transistors PS1-PS3 and a summing node 50; the latter thus sums only the currents exiting the nodes A-C. The sum current Is exiting the node 50 is sent to a comparator 51 that compares the sum current Is with a reference current Iref; if the current Is is greater than the reference current Iref the comparator sends a signal Dis to the control element 110 for deactuating the power stage 4-6 and switching off the electric motor.

As the windings 1-3 are star-connected, i.e., I1+I2+I3=0, by controlling the sum of the currents entering the node 50 also the sum of the exiting currents is controlled indirectly.

During the brake operating phase, i.e., when the control element sets the short circuit of the three windings 1-3 to Vs voltage or to ground GND respectively by commanding the switch-on of the three DMOS transistors M1, M3 and M5 or M2, M4 and M6 (in particular in the example of the mentioned embodiment, the control element sets the short circuit of the windings to the voltage Vs), if the current Is exiting the node 50 is greater than the reference current Iref the protection device 200 switches off the power stage 4-6 and the electric motor.

Through knowing the features of the motor it is possible to appropriately select the time in which the power stage will remain deactivated, thus optimizing motor braking time.

Figures 3A, 3B, 3C:
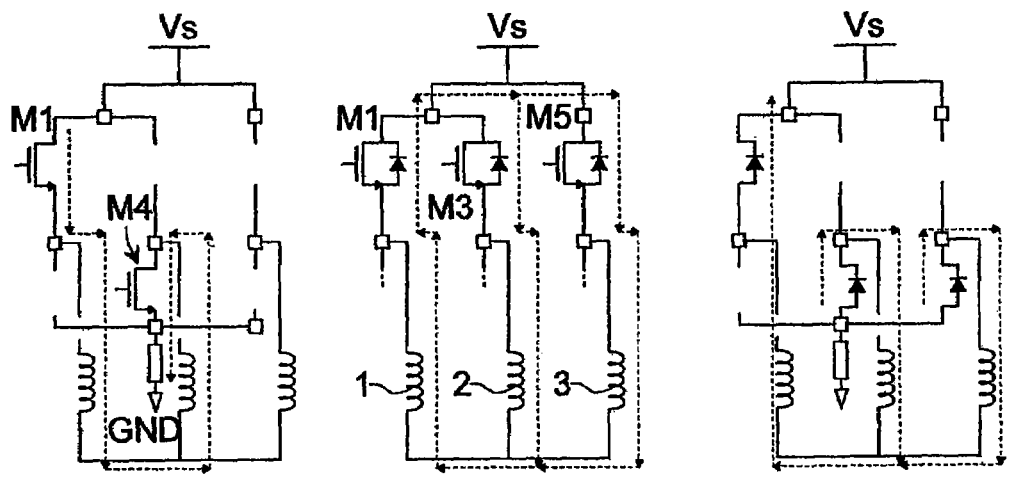
FIGS. 3A-3C show schematically various operating phases of the circuit in FIG. 2.

In FIG. 3A the circuit of FIG. 2 is shown in an operating phase in which only the transistors M1 and M4 are switched on, whilst the others are switched off. During the brake operating phase (FIG. 3B) the driving device 100 sets the switch-on of the transistors M1, M3 and M5 to short-circuit the windings 1-3 to the supply voltage Vs. In the presence of overcurrent, i.e., when the current Is exceeds the reference current Iref, the transistors M1-M6 are switched off (FIG. 3C) and the current can circulate only through the diodes coupled with the transistors M1-M6.

Figure 4:
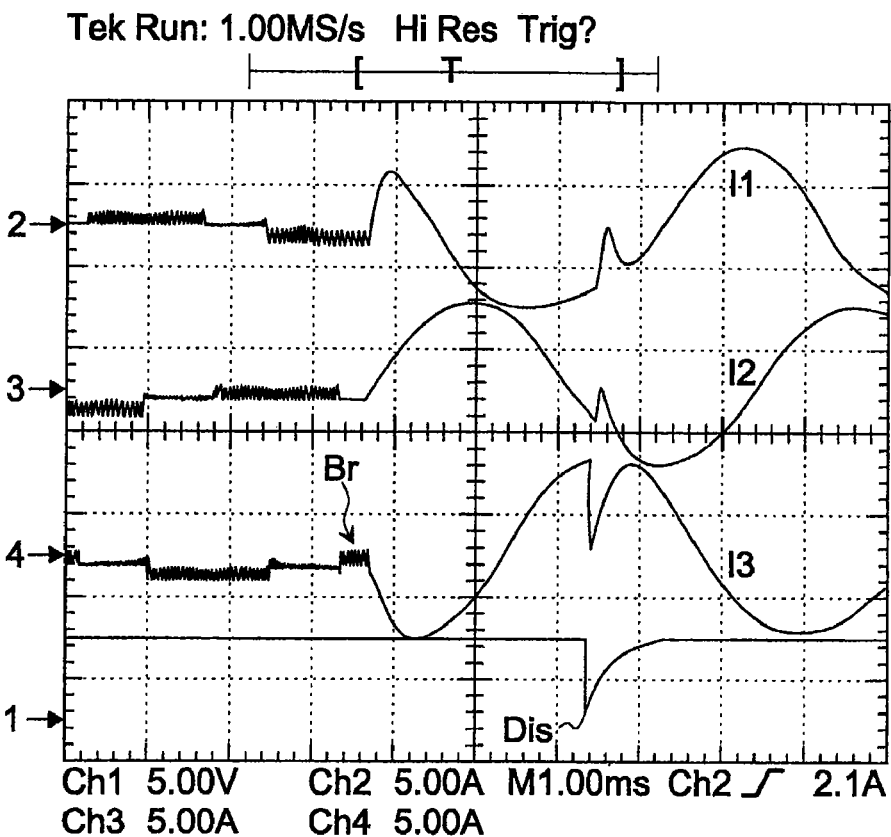
FIG. 4 is a time diagram of the currents that flow into the windings of the electric motor.

In FIG. 4 the time diagrams of the currents I1-I3 are shown. When the brake operating phase is actuated by the element 110 by means of a command Br, the currents I1-I3 have a different time trend; if the current Is overcomes the reference current Iref, the command Dis (pulse command) intervenes that deactuates the power stage 4-6.

The protection device 200 thus enables control to be obtained of the currents that circulate in the windings of the electric motor during implementation of the brake operating phase and to protect the power stage 4-6 independently of the mechanical constants of the motor and of rotation speed of the motor. Furthermore, it is possible to optimize braking time of the electric motor by a suitable selection of the reference current Iref.

The invention claimed is:

1. A protection device for a driving device for an electric motor with at least three phases, said electric motor including at least three windings and said driving device including a power stage suitable for driving directly said at least three windings, said driving device being suitable for actuating a motor brake operating phase, said driving device including means suitable for detecting currents that flow in the windings of the motor, the protection device comprising:
first means suitable for selecting currents having a single direction of said detected currents; and
second means suitable for deactuating said power stage during said motor brake operating phase when a sum of said currents having a single direction is greater than a reference current.

2. The protection device according to claim 1, wherein said first means comprises diodes series connected to said detecting means of the currents that flow in the windings of the motor.

3. The protection device according to claim 1, further comprising a summing node and said currents having a single direction are currents entering said summing node.

4. The protection device according to claim 1, wherein said second means comprises a comparator suitable for comparing said sum of said currents having a single direction with said reference current and suitable for emitting a signal to deactuate said power stage.

5. A driving device for an electric motor with at least three phases, said electric motor including at least three windings, said driving device comprising:
a power stage suitable for driving directly said at least three windings;
actuating means for actuating a motor brake operating phase;
detecting means for detecting currents that flow in the windings of the motor;
selecting means suitable for selecting currents having a single direction of said detected currents; and
deactuating means suitable for deactuating said power stage during said motor brake operating phase when a sum of said currents having a single direction is greater than a reference current.

6. The driving device according to claim 5, wherein said selecting means comprises diodes connected to said detecting means of the currents that flow in the windings of the motor.

7. The driving device according to claim 5, further comprising a summing node receiving said currents having a single direction.

8. The driving device according to claim 5, wherein said deactuating means comprises a comparator suitable for comparing said sum of said currents having a single direction with said reference current and suitable for emitting a signal to deactuate said power stage.

9. The driving device according to claim 5 wherein the power stage includes at least three power transistors connected respectively to the at least three windings and the detecting means includes at least three detecting transistors connected respectively to the at least three power transistors.

10. The driving device according to claim 5 wherein the power stage includes first, second, and third power transistors connected respectively to first, second, and third windings of the at least three windings; the detecting means includes first, second, and third detecting transistors connected respectively to the first, second, and third power transistors; and the selecting means comprises first, second, and third selectors series-connected respectively to said first, second, and third detecting transistors.

11. The motor according to claim 5 wherein the power stage includes first, second, and third power transistors connected respectively to first, second, and third windings of the three windings; the detecting means includes first, second, and third detecting transistors connected respectively to the first, second, and third power transistors; and the selecting means comprises first, second, and third selectors series-connected respectively to said first, second, and third detecting transistors.

12. An electric motor, comprising:
three windings;
a power stage suitable for driving directly said three windings;
actuating means for actuating a motor brake operating phase;
detecting means for detecting currents that flow in the windings of the motor;
selecting means suitable for selecting currents having a single direction of said detected currents; and
deactuating means suitable for deactuating said power stage during said motor brake operating phase when a sum of said currents having a single direction is greater than a reference current.

13. The motor according to claim 12, wherein said selecting means comprises diodes connected to said detecting means of the currents that flow in the windings of the motor.

14. The motor according to claim 12, further comprising a summing node receiving said currents having a single direction.

15. The motor according to claim 12, wherein said deactuating means comprises a comparator suitable for comparing said sum of said currents having a single direction with said reference current and suitable for emitting a signal to deactuate said power stage.

16. The motor according to claim 12 wherein the power stage includes at least three power transistors connected respectively to the at least three windings and the detecting means includes at least three detecting transistors connected respectively to the at least three power transistors.

17. An electric motor, comprising:
   first, second, and third windings;
   first, second, and third power switches coupled respectively to the first, second, and third windings and structured to drive the respective windings;
   first, second, and third detectors coupled respectively to the first, second, and third power switches and structured to detect currents that flow in the respective windings;
   a summing element coupled to the first, second, and third detectors and structured to produce a sum value that is indicative of a sum of the currents detected;
   a comparator having a first input coupled to the summing element and a second input coupled to a reference value and structured to deactuate the power switches when the sum value exceeds the reference value; and
   first, second, and third diodes connected respectively between the first, second, and third detectors and the summing element.

18. The motor according to claim 17, further comprising a controller coupled between the comparator and the power switches and structured to deactuate the power switches in response to receiving a signal from the comparator indicating that the sum value exceeds the reference value.

19. The motor according to claim 17, wherein:
   the first detector includes a first detection transistor having a control terminal coupled to a control terminal of the first power switch, a first conduction terminal coupled to a first conduction terminal of the first power switch, and a second conduction terminal coupled to the first diode;
   the second detector includes a second detection transistor having a control terminal coupled to a control terminal of the second power switch, a first conduction terminal coupled to a first conduction terminal of the second power switch, and a second conduction terminal coupled to the second diode; and
   the third detector includes a third detection transistor having a control terminal coupled to a control terminal of the third power switch, a first conduction terminal coupled to a first conduction terminal of the third power switch, and a second conduction terminal coupled to the third diode.

* * * * *